(12) United States Patent
Yamada

(10) Patent No.: US 9,967,425 B2
(45) Date of Patent: May 8, 2018

(54) IMAGE FORMING APPARATUS

(71) Applicant: KYOCERA Document Solutions Inc., Osaka-shi, Osaka (JP)

(72) Inventor: Shinichiro Yamada, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 0 days. days.

(21) Appl. No.: 15/715,191

(22) Filed: Sep. 26, 2017

(65) Prior Publication Data

US 2018/0097964 A1 Apr. 5, 2018

(30) Foreign Application Priority Data

Sep. 30, 2016 (JP) .................... 2016-193831

(51) Int. Cl.
| | |
|---|---|
| *H04N 1/00* | (2006.01) |
| *H04N 1/23* | (2006.01) |
| *G06K 9/20* | (2006.01) |
| *G06K 9/03* | (2006.01) |
| *G09B 7/04* | (2006.01) |

(Continued)

(52) U.S. Cl.
CPC ............ *H04N 1/233* (2013.01); *G06K 9/036* (2013.01); *G06K 9/2054* (2013.01); *G06K 9/623* (2013.01); *G06K 9/72* (2013.01); *G09B 7/04* (2013.01); *H04N 1/00331* (2013.01); *H04N 1/00803* (2013.01); *G06K 2209/01* (2013.01); *H04N 2201/0094* (2013.01)

(58) Field of Classification Search
CPC ............... H04N 1/233; H04N 1/00331; H04N 1/00803; H04N 2201/0094; G06K 9/623; G06K 9/72; G06K 9/036; G06K 9/2054; G06K 2209/01; G09B 7/04
See application file for complete search history.

(56) References Cited

U.S. PATENT DOCUMENTS

| | | | | |
|---|---|---|---|---|
| 6,684,052 B2* | 1/2004 | Kucinski | ............ | G06K 17/0032 382/311 |
| 8,280,300 B2* | 10/2012 | Slijp | .................. | G06K 17/0032 434/353 |
| 9,773,425 B2* | 9/2017 | Shimada | .................. | G09B 7/04 |

(Continued)

FOREIGN PATENT DOCUMENTS

| | | |
|---|---|---|
| JP | H08-160848 A | 6/1996 |
| JP | 2005-062675 A | 3/2005 |

*Primary Examiner* — Kent Yip

(57) ABSTRACT

A multifunction peripheral includes an answerer identifying unit, a character data extracting unit, a correct/incorrect determining unit, a question data extracting unit, a question sheet image data creating unit, and an image formation control unit. The correct/incorrect determining unit determines answers on a question sheet as correct or incorrect based on characters extracted by the character data extracting unit. The question data extracting unit extracts a plurality of questions from question data stored in a storage unit in accordance with the ratio of correct answers determined by the correct/incorrect determining unit, for each of answerers identified by the answerer identifying unit. The question sheet image data creating unit creates image data of the question sheet with the questions, which are extracted from the question data by the question data extracting unit, arranged thereon.

6 Claims, 9 Drawing Sheets

(51) Int. Cl.
*G06K 9/72* (2006.01)
*G06K 9/62* (2006.01)

(56) References Cited

U.S. PATENT DOCUMENTS

2003/0086116 A1* 5/2003 Hall .................. G06K 17/0032
   358/1.15
2017/0092146 A1* 3/2017 Shimada .................. G09B 7/04

* cited by examiner

IMAGE FORMING APPARATUS

CROSS REFERENCE TO RELATED APPLICATIONS

This application claims priority to Japanese Patent Application No. 2016-193831, which was filed on Sep. 30, 2016, and is incorporated herein by reference in its entirety.

BACKGROUND

The present disclosure relates to an image forming apparatus.

Image forming apparatuses, which are typified by multifunction peripherals, read an image of an original document by using an image reading unit, and then emit light to a photoreceptor in an image forming unit based on the read image to form an electrostatic latent image on the photoreceptor. Then, the image forming apparatuses apply charged toner onto the formed electrostatic latent image to make it into a visible image that is in turn transferred onto a sheet of paper and fixed, and then output the sheet.

With the image forming apparatuses, a technique of forming and outputting an image of questions used in learning activities has been conventionally known.

A conventional question making apparatus includes an input means, an internal storage means, an external storage means, a CPU, a display means, and a print means. The question making apparatus processes an instruction, which is input through the input means, in the CPU, selectively displays questions stored in the storage means on the display means, and prints desired questions using the print means. A feature of the question making apparatus is to store codes for setting up the output conditions required to make questions in the internal storage means. The output conditions include, for example, time for answering the questions, an amount of questions measurable by the number of pages, allocation of points, answers and explanations, and tips.

A typical individual worksheet creating system includes a question database that stores question data classified by a predetermined classification method and stored with target indexes, and a data generating means that generates learner-specific worksheet data used to create worksheets for individual learners. The learner-specific worksheet data includes the question data selected from the question database according to the learners' past record data which are summarized for each target index.

SUMMARY

The image forming apparatus according to the present disclosure can form an image of a question sheet. The image forming apparatus includes an image forming unit, an answerer identifying unit, an image reading unit, a character data extracting unit, a storage unit, a correct/incorrect determining unit, a question data extracting unit, a question sheet image data creating unit, and an image formation control unit. The image forming unit forms an image based on image data. The answerer identifying unit identifies an answerer who fills in answers on a question sheet. The image reading unit reads image data of the question sheet with the answers filled in by the answerer. The character data extracting unit extracts characters, by means of optical character recognition (OCR), from the image data of the question sheet read by the image reading unit. The storage unit stores question data including a plurality of questions of different difficulty levels. The correct/incorrect determining unit determines the answers on the question sheet as correct or incorrect based on the characters extracted by the character data extracting unit. The question data extracting unit extracts a plurality of questions from the question data stored in the storage unit in accordance with the ratio of correct answers determined by the correct/incorrect determining unit, for each answerer identified by the answerer identifying unit. The question sheet image data creating unit creates image data of the question sheet with the questions, which are extracted from the question data by the question data extracting unit, arranged thereon. The image formation control unit performs control operations to form an image using the image forming unit based on the image data of the question sheet created by the question sheet image data creating unit.

BRIEF DESCRIPTION OF THE DRAWINGS

FIG. 8 shows the question sheet with answers filled in.

DETAILED DESCRIPTION

Figure 1:
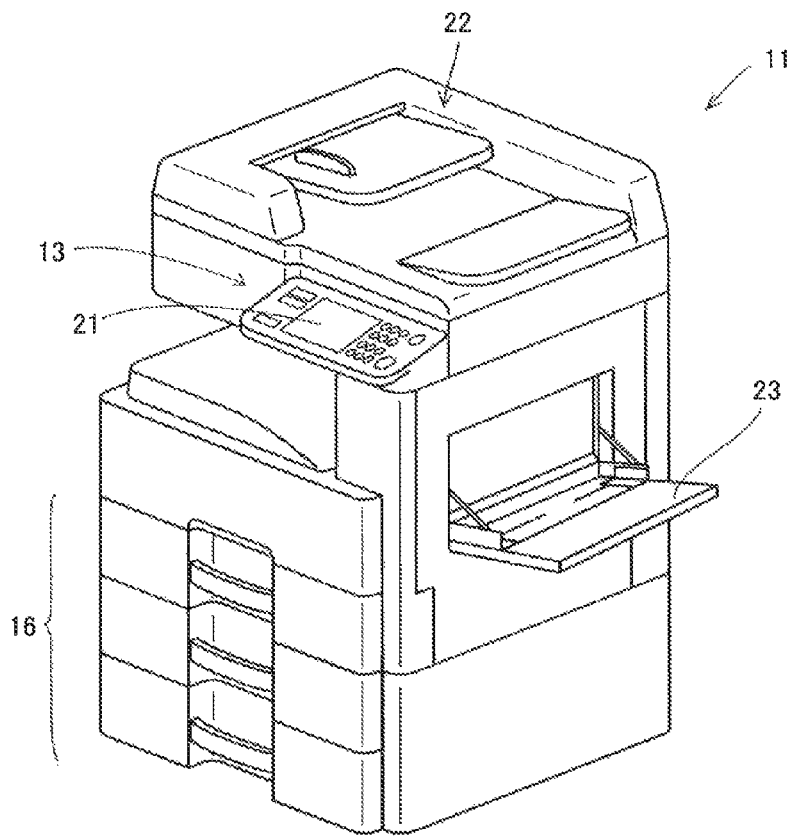
FIG. 1 is a schematic external view of a multifunction peripheral to which an image forming apparatus according to an embodiment of the present disclosure is applied.
Figure 2:
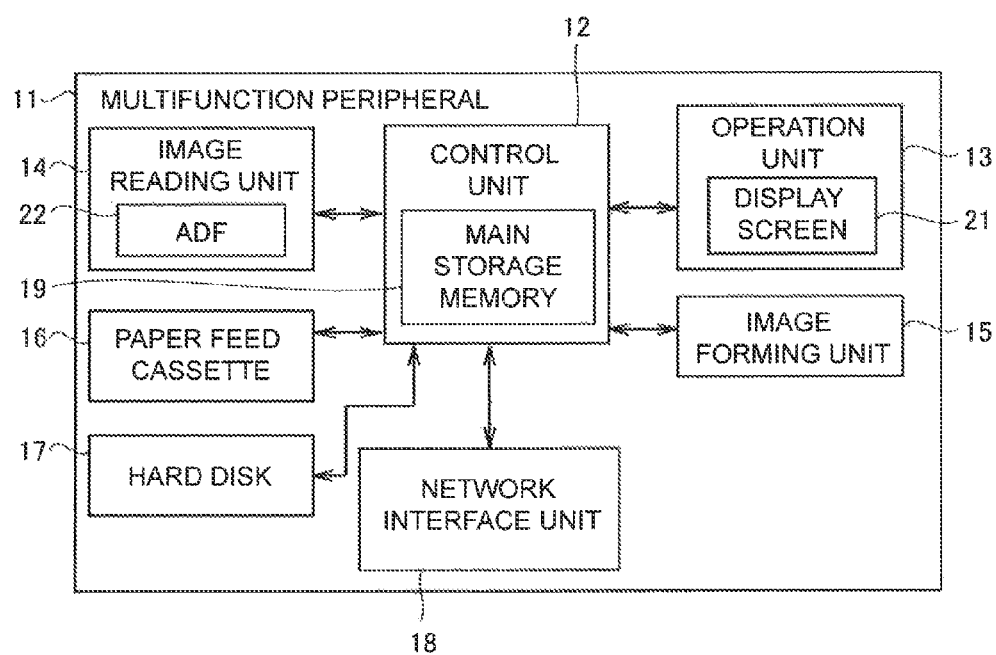
FIG. 2 is a block diagram showing the configuration of the multifunction peripheral shown in FIG. 1.

An embodiment of the present disclosure will be described below. FIG. 1 is a schematic external view of a multifunction peripheral 11 to which an image forming apparatus according to the embodiment of the present disclosure is applied. FIG. 2 is a block diagram showing the configuration of the multifunction peripheral 11 shown in FIG. 1.

Referring to FIGS. 1 and 2, the multifunction peripheral 11 has a plurality of functions relating to image processing, such as a copying function, a printer function, and a facsimile function. The multifunction peripheral 11 includes a control unit 12, an operation unit 13, an image reading unit 14, an image forming unit 15, paper feed cassettes 16, a hard disk 17, a network interface unit 18 used to connect with a network (not shown), and a manual feed tray 23.

The control unit 12 controls the entire multifunction peripheral 11, and includes a main storage memory 19 that temporarily stores data. The operation unit 13 includes a touch panel type display screen 21 that serves as a display unit displaying information submitted from the multifunction peripheral 11 and entries made by users. The operation unit 13 accepts entry of information relating to image formation, such as image forming conditions including the number of prints and gradation degrees, from users. The image reading unit 14 includes an auto document feeder (ADF) 22 serving as a document transporting device that transports an original document placed on a loading position to a reading position. The image reading unit 14 reads images of the original document loaded in the ADF 22 or placed on a document table (not shown). Each of the paper feed cassettes 16 can hold a plurality of sheets of paper. The manual feed tray 23 allows users to manually load sheets of paper. The image forming unit 15 forms an image on paper transported from the paper feed cassettes 16 or the manual feed tray 23 based on image data of the original document read by the image reading unit 14 or image data transmitted via the network. The hard disk 17 stores data relating to image formation, such as transmitted image data and input image forming conditions.

The multifunction peripheral 11 is connectable to various external devices through the network interface unit 18. Specific examples of the external devices connectable to the multifunction peripheral 11 via the network (not shown) include a computer, a tablet terminal, an external memory device, a server, and cloud computing.

Figure 3:
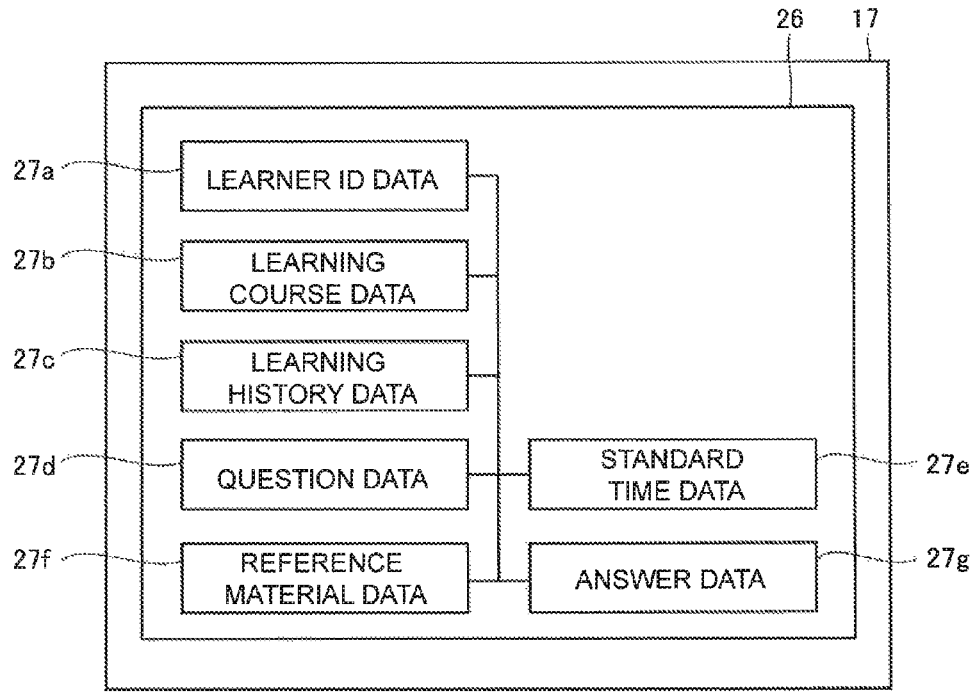
FIG. 3 is a conceptual diagram of data stored in a hard disk.

Next, configuration of data stored in the hard disk 17 will be described. FIG. 3 is a conceptual diagram of the data stored in the hard disk 17. Referring to FIG. 3, the hard disk 17 has a storage area 26 that holds learner ID data 27*a* that includes learners' IDs assigned to individual learners who answer questions, learning course data 27*b* that includes courses taken by the learners, learning history data 27*c* that manages the information of the learners' learning histories, question data 27*d* that includes questions categorized by levels of the questions, in other words, difficulty levels of the questions or the size of question sentences, standard time data 27*e* that includes standard times required to answer the questions, reference material data 27*f* that is referred to for checking and explaining the answers, and answer data 27*g* that includes answers associated with the questions in the question data 27*d*.

The learner ID data 27*a* is data of personal IDs assigned to individual learners. The learning course data 27*b* includes learning courses chosen by learners and assigned by teachers. The learning history data 27*c* is data of learning records of individual learners in the past, including the dates, times, and durations of time the learners answered the questions in the past, the learning courses chosen, and the correct/incorrect results. The learning course data 27*b* and learning history data 27*c* are registered in association with the learner ID data 27*a*. The question data 27*d* contains a plurality of questions prepared for various levels and organized by, for example, the number of characters per question, and is stored in the hard disk 17. The standard times in the standard time data 27*e* are, for example, average times required for general learners to answer the questions. The data 27*a* to data 27*g* are used to extract questions, to check the answers, and to add explanations.

Figure 4:
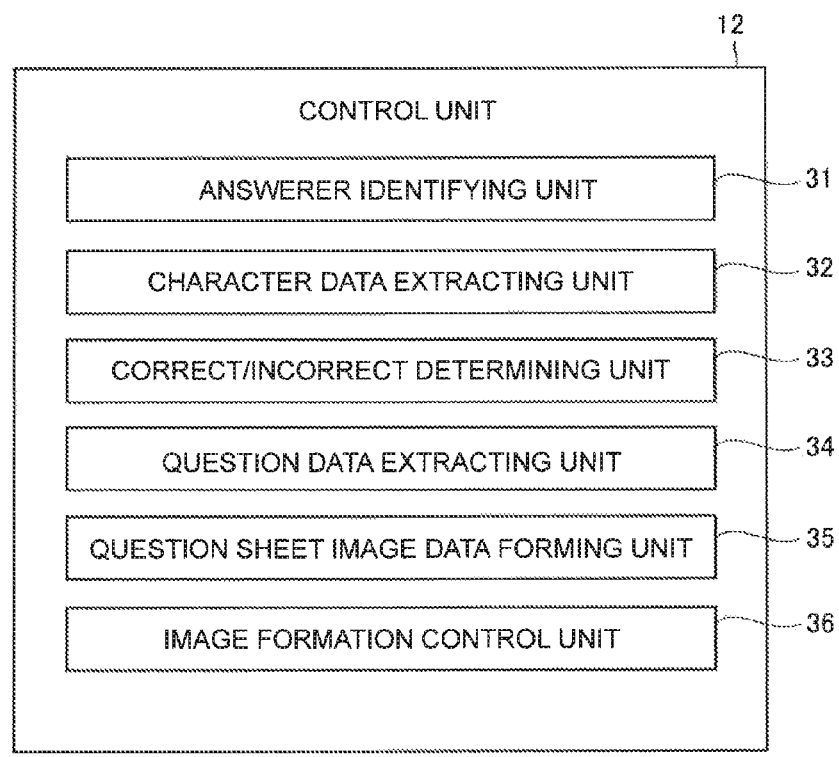
FIG. 4 is a block diagram showing the configuration of a control unit.

Next, the configuration of the control unit 12 will be described. FIG. 4 is a block diagram showing the configuration of the control unit 12. Referring to FIG. 4, the control unit 12 includes an answerer identifying unit 31, a character data extracting unit 32, a correct/incorrect determining unit 33, a question data extracting unit 34, a question sheet image data forming unit 35, and an image formation control unit 36. The answerer identifying unit 31 identifies the answerer who fills in answers on a question sheet. The character data extracting unit 32 extracts character data by means of OCR from image data of the question sheet read by the image reading unit 14. The correct/incorrect determining unit 33 determines the answers filled in the question sheet as correct or incorrect based on the characters extracted by the character data extracting unit 32. The question data extracting unit 34 extracts a plurality of questions from the question data stored in the hard disk 17 in accordance with the ratio of correct answers determined by the correct/incorrect determining unit 33 for every answerer identified by the answerer identifying unit 31. The question sheet image data forming unit 35 creates image data of the question sheet with the questions, which are extracted from the question data by the question data extracting unit 34, arranged thereon. The image formation control unit 36 performs control operations to form an image using the image forming unit 15 based on the image data of the question sheet created by the question sheet image data creating unit 35. The configuration of these units will be described later in detail.

Figure 5:
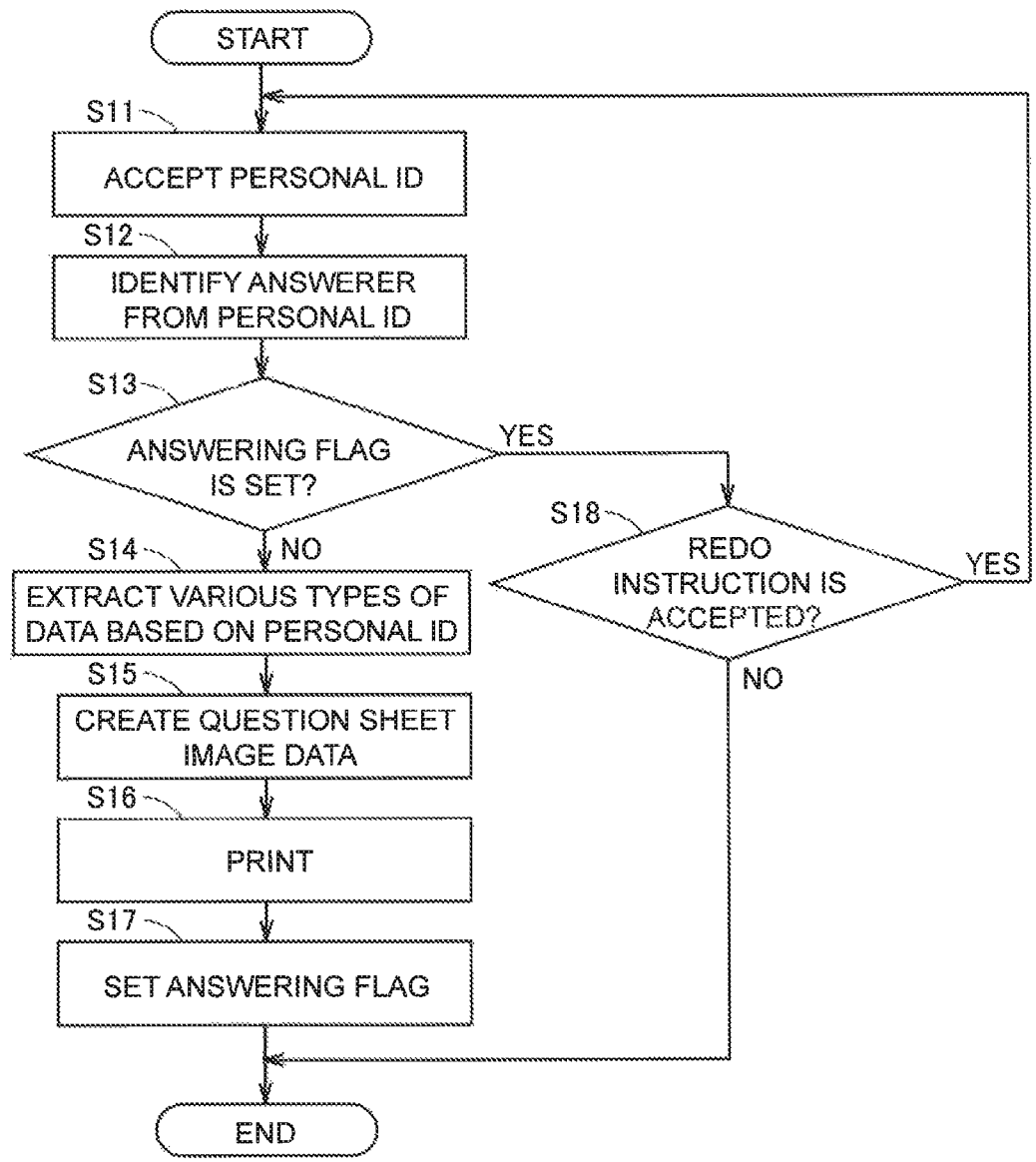
FIG. 5 is a flowchart of a process of creating and printing a question sheet using the multifunction peripheral.

A process of printing a question sheet using the multifunction peripheral 11 will be described. FIG. 5 is a flowchart of the process in which the multifunction peripheral 11 creates and prints a question sheet. In this example, the learner's personal ID is the learner's name "XXX", the learning time is 60 minutes, and the degree of fatigue is 70%.

Referring to FIG. 5, the learner enters his/her personal ID through the display screen 21 of the operation unit 13. In response to that, the answerer identifying unit 31 accepts the entry of the personal ID (step S11 in FIG. 5, hereinafter "step" is omitted).

Figure 6:
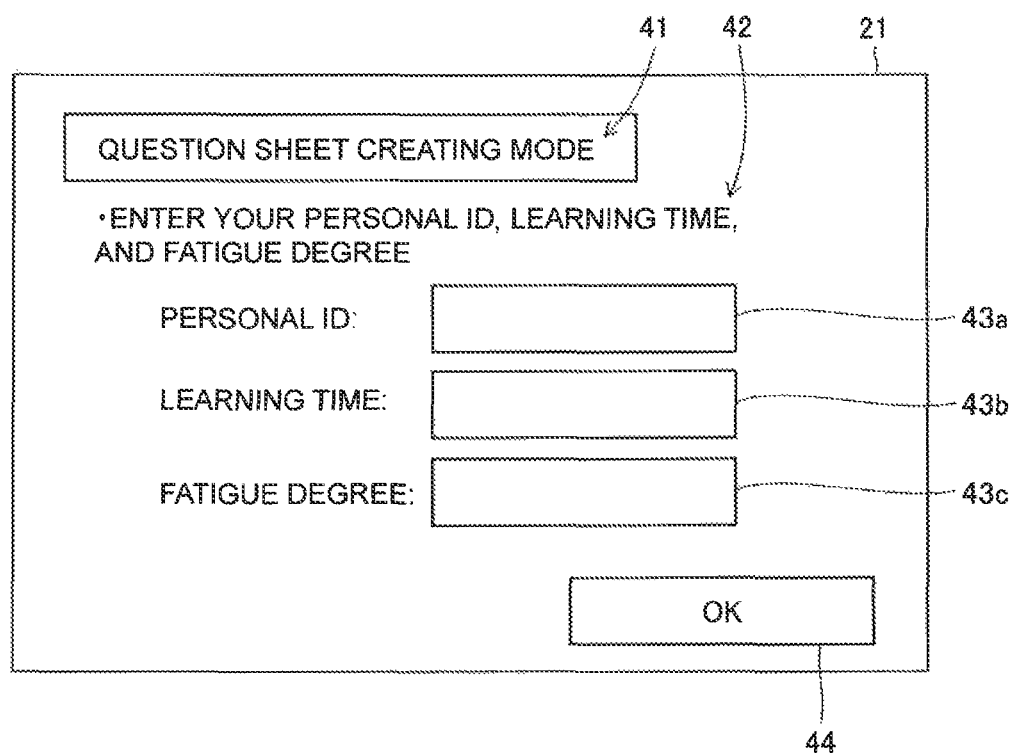
FIG. 6 shows an example display screen used to enter personal ID.

FIG. 6 shows an example of the display screen 21 used to enter the personal ID. Referring to FIG. 6, the display screen 21 displays a statement 41 "Question sheet creating mode", a message 42 "Enter your personal ID, learning time, and fatigue degree", a personal ID input field 43*a* in which personal ID is input, a learning time input field 43*b* in which learning time is input, a fatigue degree input field 43*c* in which a learner's current fatigue degree is input, and an enter key 44 labeled "OK" and proceeding to the next screen with a press.

The learner, who may be a cram school student or regular school student in this example, enters his/her personal ID, learning time, and degree of fatigue at the present time into the personal ID input field 43*a*, learning time input field 43*b*, and fatigue degree input field 43*c*, respectively. Then, the answerer identifying unit 31 accepts the entry of the personal ID, learning time, and fatigue degree. In this example, the learning time and fatigue degree are input by numerical values, for example, 60 minutes and 70%. The fatigue degree is measured on a percentage basis, and is expressed as 100% when the learner is free from fatigue. The learner expresses his/her feeling of fatigue by a numerical value upon requesting a question sheet. Then, the answerer identifying unit 31 checks the personal ID against the learner ID data 27*a* stored in the hard disk 17, or performs other actions to identify the learner associated with the personal ID as an answerer (S12).

It is subsequently determined whether an answering flag, which is programmed to be set after the learner outputs a question sheet, is set (S13). If it is determined that the answering flag has not been set (YES in S13), the question data extracting unit 34 extracts various types of data from the hard disk 17 based on the identified personal ID data and the other data (S14). Specifically, the question data extracting unit 34 extracts a learner ID associated with the input personal ID from the learner ID data 27*a*. Then, the question data extracting unit 34 extracts a learning course and learning history, which are associated with the learner ID extracted from the learner ID data 27*a*, from the learning course data 27*b* and learning history data 27*c*. In accordance with the contents of the learning course and learning history, the question data extracting unit 34 extracts a plurality of questions from the question data 27*d* based on the contents of the associated reference material in the reference material data 27*f*. The questions are extracted from the question data 27*d* in accordance with the contents of the associated learning history, the level of the learner stored in the hard disk 17, the standard times required to answer the questions, the learning time input in the learning time input field 43*b*, and some other factors.

With the questions extracted from the question data 27*d*, the question sheet image data forming unit 35 creates question sheet image data, which is image data of a question sheet (S15). The image data is created such that the questions, which have been extracted from the question data 27*d*, are arranged with a minimum blank area on the question sheet. The image formation control unit 36 controls the image forming unit 15 to form an image of the created question sheet image data and print it on paper (S16). In this manner, the question sheet is printed. The multifunction peripheral 11 sets an answering flag at the completion of printing on the assumption that the learner has started answering the questions (S17).

Figure 7:
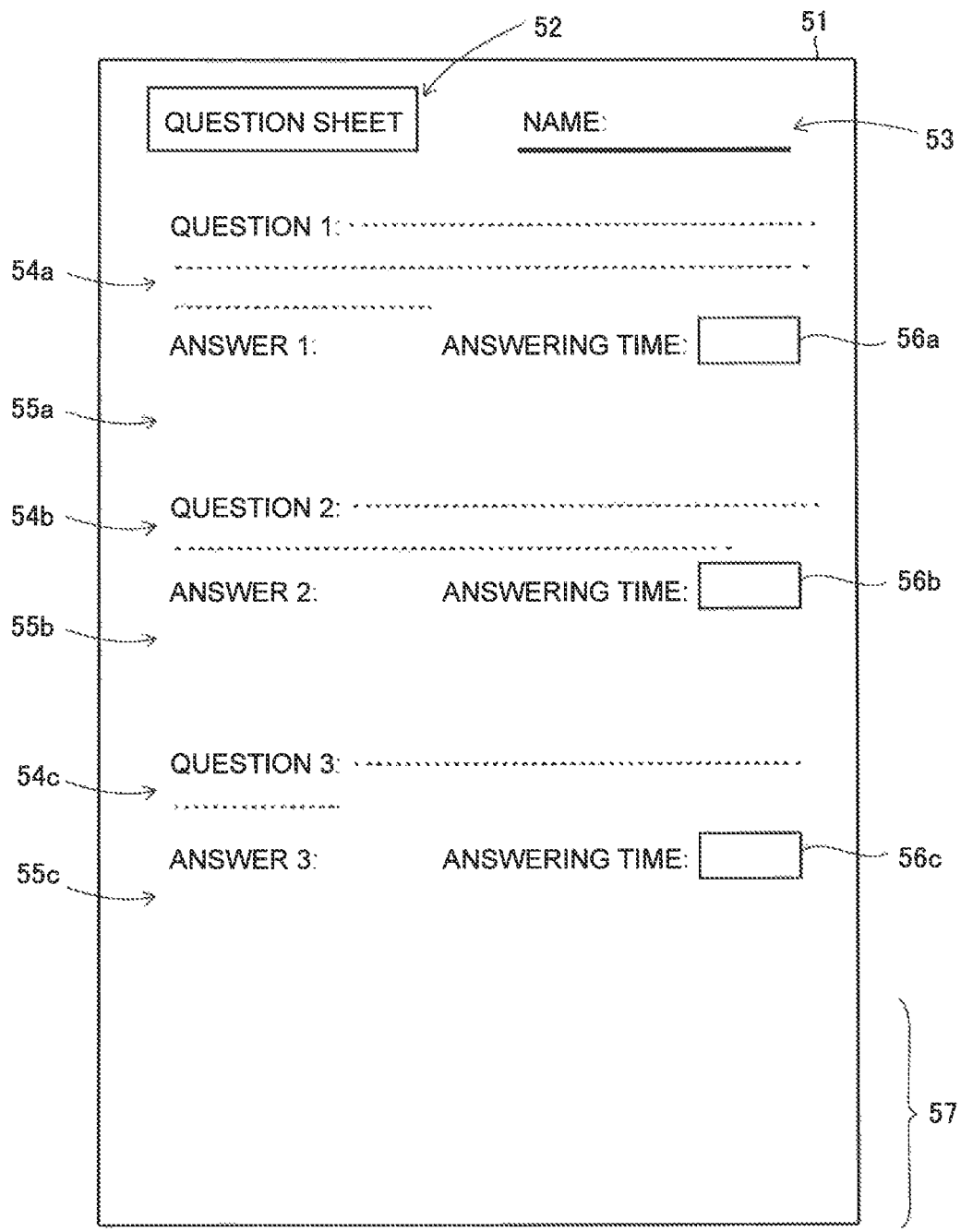
FIG. 7 shows an example question sheet created.

FIG. 7 shows an example of the question sheet created. Referring to FIG. 7, the question sheet 51 includes a statement 52 "Question sheet", a name field 53 in which the name of the answerer, that is a learner, is filled in, and three question sections 54*a*, 54*b*, 54*c*. Each of the question sections 54*a* to 54*c* is composed of a question sentence of more than one line. Under the question section 54*a*, an answer section 55*a* is provided to be filled with an answer to the question sentence, and an answering time field 56*a* is provided at the upper right with respect to the answer section 55*a* to be filled with the answering time taken by the answerer. In like manner, an answer section 55*b* is provided under the question section 54*b*, and an answering time field 56*b* is provided at the upper right with respect to the answer section 55*b*. In addition, an answer section 55*c* is provided under the question section 54*c*, and an answering time field 56*c* is provided at the upper right with respect to the answer section 55*c*.

The question sheet 51 in this example is provided with the three question sections 54*a* to 54*c*. Three questions in the three question sections 54*a* to 54*c* are extracted from the question data 27*d* so that all the questions fit within the input learning time frame in accordance with the level of the identified answerer and the extracted various types of data. Before extraction of the questions, the standard time is revised in accordance with the input fatigue degree. The question sheet 51 has a blank area 57 under the question section 54*c*. If another question is printed in the blank area 57, the answerer may not have time to answer the question in consideration of the input learning time, fatigue degree, and other factors, and consequently there is a high possibility that the printed question may go to waste.

If it is determined that the answering flag is set in S13 (YES in S13), it is determined whether multifunction peripheral 11 has accepted an instruction to redo the process from the beginning through the operation unit 13 or the other units (S18). If the redo instruction has been accepted (YES in S18), the process goes back to S11 to start the process from the beginning. If, on the other hand, the redo instruction has not been accepted, the process is just terminated (NO in S18). This means that the process ends without creating the question sheet.

The learner fills out the printed question sheet 51 within the learning time. While filling in the answers, the learner writes the answering times required to answer the questions in the answering time fields 56*a* to 56*c*, respectively. Then, the learner submits the question sheet 51 to a marker, or more specifically a teacher or an instructor. The teacher or instructor uses the multifunction peripheral 11 to mark the answers on the question sheet 51 in the manner that will be described later. The answering flag set in S17 is cleared by inputting an instruction or the like through the operation unit 13.

Figure 8:
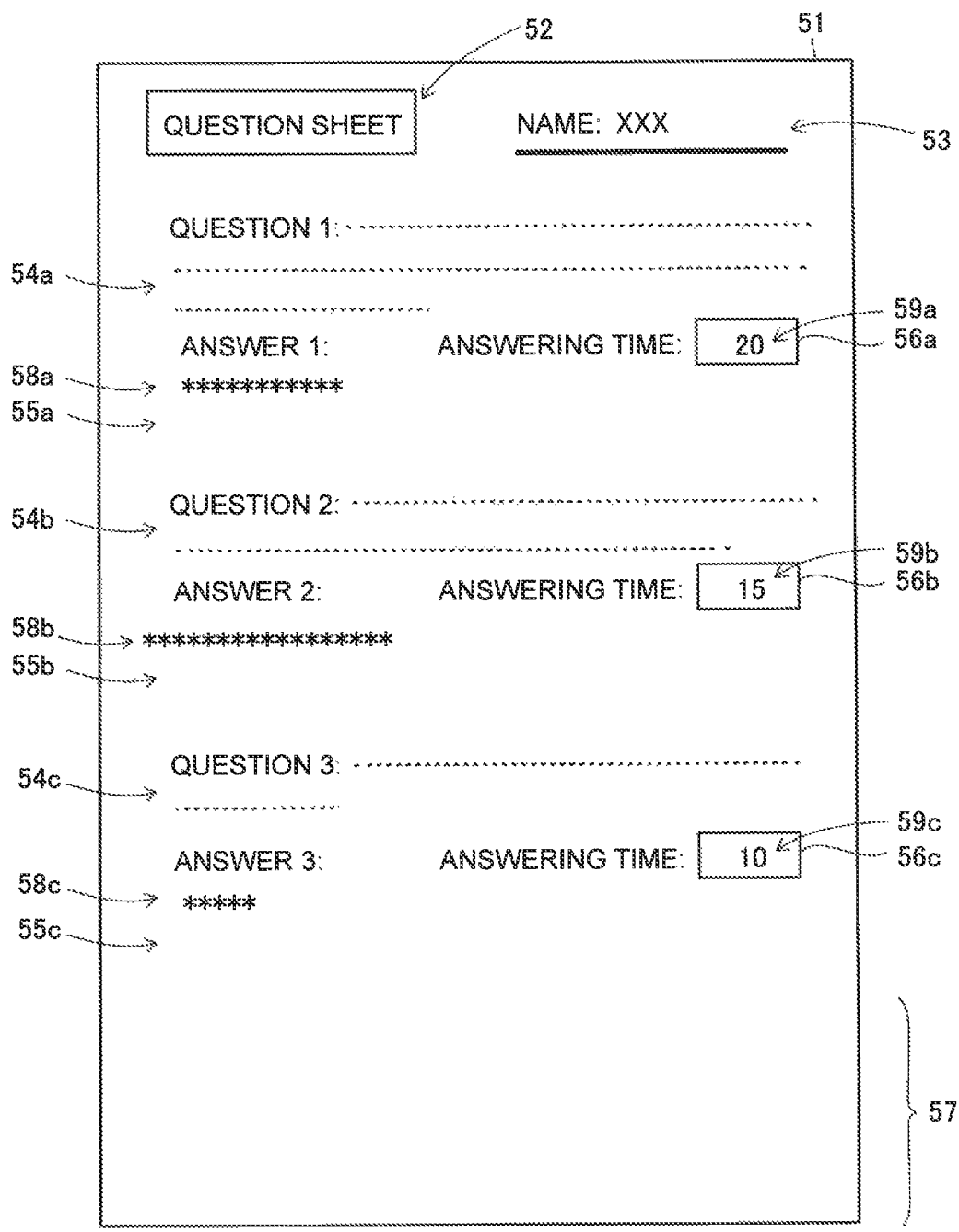

FIG. 8 shows the question sheet 51 with the answers filled in. Referring to FIG. 8, the name field 53 is filled in with the name "XXX". The answer sections 55*a* to 55*c* are filled in with answers 58*a*, 58*b*, 58*c*, respectively, by the learner. The answering time fields 56*a* to 56*c* are filled in with answering times 59*a*, 59*b*, 59*c*, which are required to figure out the answers 58*a* to 58*c*, respectively. The answering times 59*a* to 59*c* are times that are actually measured by the learner while answering the questions.

Figure 9:
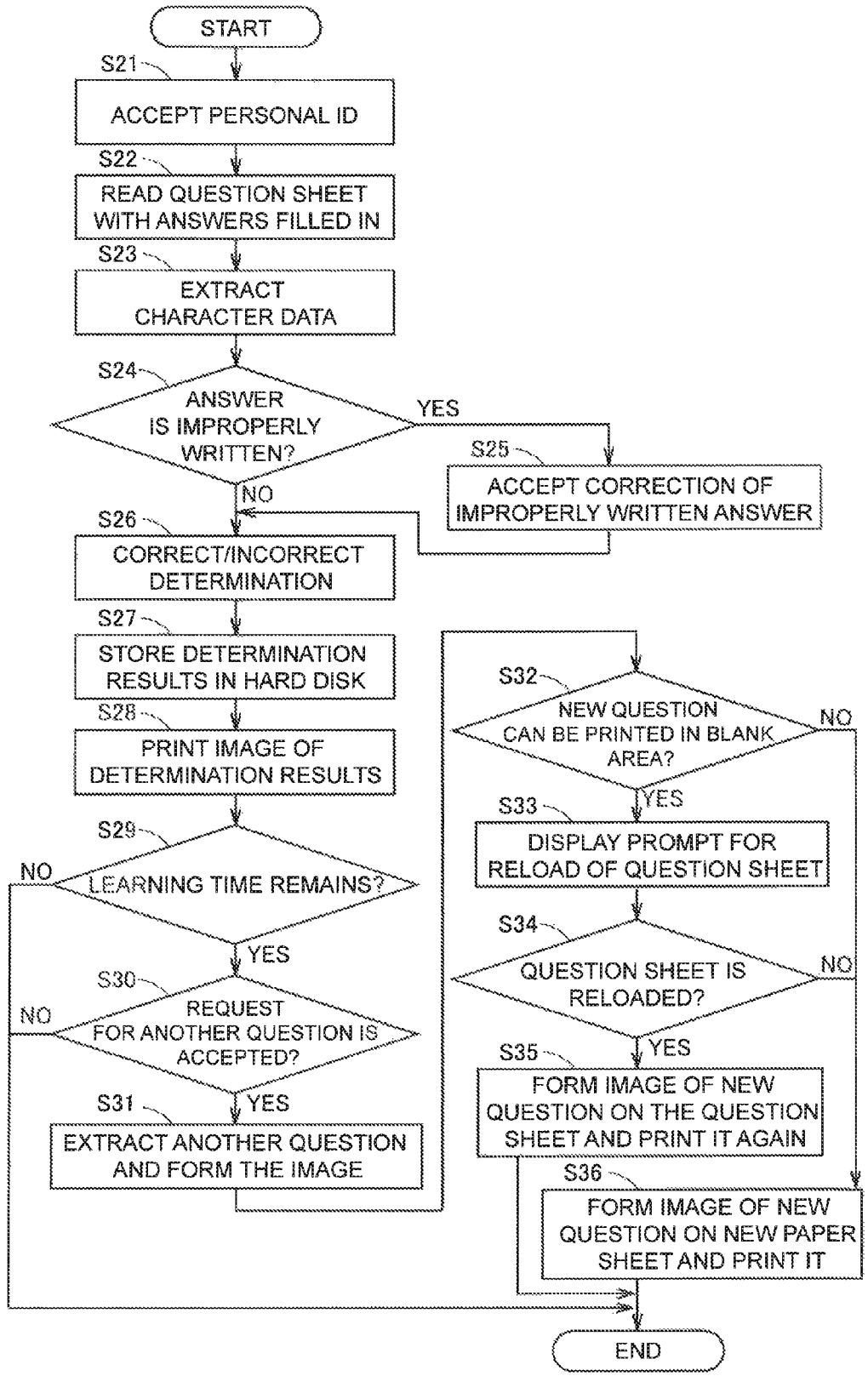
FIG. 9 is a flowchart of a process after the learner has filled in the answers on the question sheet.

Next, a description will be made about a process after the learner has filled in the answers 58*a* to 58*c* on the question sheet 51. FIG. 9 is a flowchart of the process after the learner has filled in the answers 58*a* to 58*c* on the question sheet 51. At this point, the question sheet 51 is supposed to have been submitted to a teacher from the learner.

Referring to FIG. 9, the teacher loads the question sheet into the ADF 22. Then, the teacher manipulates the operation unit 13 to enter a personal ID, in this example, the personal ID of the answerer "XXX". The multifunction peripheral 11 accepts the entry of personal ID (S21).

Once the multifunction peripheral 11 detects the press of a start key on the operation unit 13 to start reading images, reading of the question sheet 51 starts (S22). Specifically, the ADF 22 transports the loaded question sheet 51 to the image reading position. Then, the image reading unit 14 reads the image of the question sheet 51. The read image is shown in FIG. 8.

Next, the character data extracting unit 32 extracts character data, by means of OCR, from the image data of the question sheet 51 read by the image reading unit 14. Specifically, the character data of the answers 58*a* to 58*c* filled in the answer sections 55*a* to 55*c* and the character data of the answering times 59*a* to 59*c* filled in the answering time fields 56*a* to 56*c* are extracted (S23).

In this extraction step, it is determined whether the answers 58*a* to 58*c* are properly written on the question sheet 51 (S24). Improperly written answers cannot be extracted as character data by the OCR, and also the answers 58*a* to 58*c* written partially outside of the answer sections 55*a* to 55*c*, respectively, cannot be properly recognized as characters by the OCR. If the answers 58*a* to 58*c* are improperly written (YES in S24), the multifunction peripheral 11 prompts for correction of the impropriety and accepts the correction (S25). Specifically, the display screen 21 displays a screen that shows an improperly written answer and prompts the teacher to correct it using the touch panel of the display screen 21.

Figure 10:
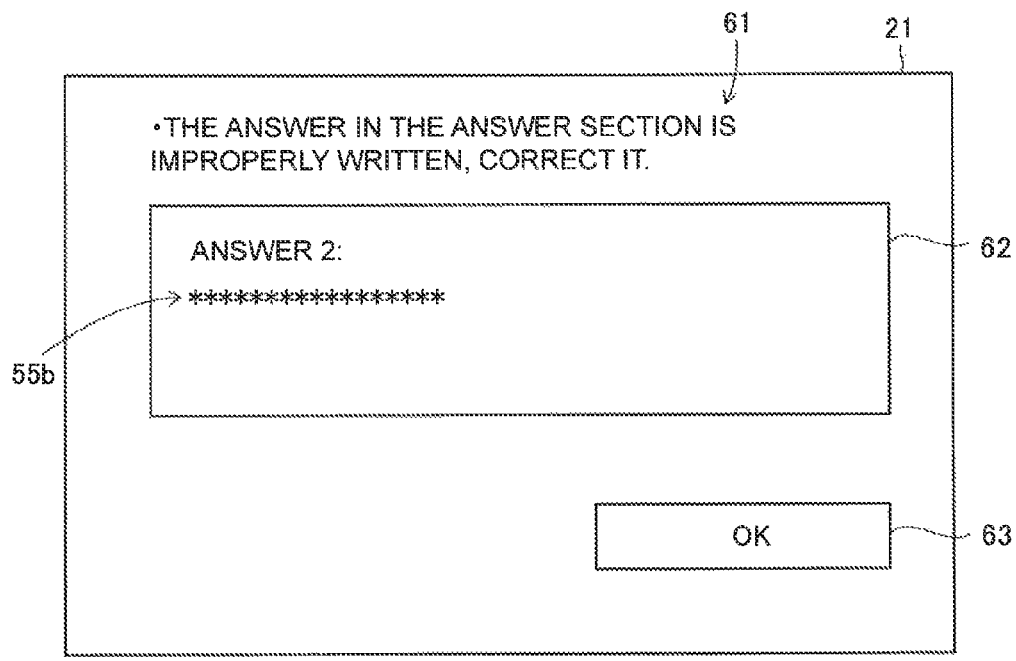
FIG. 10 shows an example display screen prompting for correction of an improperly written answer.

FIG. 10 is an example display screen 21 prompting for correction of the impropriety of the answer. Referring to FIG. 10, the display screen 21 includes a message 61 "The answer in the answer section is improperly written. Correct it.", a representation 62 of the answer in the answer section 55*b*, an enter key 63 labeled "OK" and confirms completion of correction by being pressed. The teacher manipulates the touch panel type display screen 21 to make a correction, for example, by putting the answer out of the answer section 55*b* back into the answer section 55*b*, and presses the enter key 63. The impropriety is corrected in this manner.

After the improperly written answer is corrected as described above, character data is extracted from the written answers, and the character data associated with the answers 58a to 58c is subjected to correct/incorrect determination (S26). The answers are checked by determining whether the character data extracted from the answers 58a to 58c contains characters corresponding to the answers in the answer data 27g associated with the questions extracted from the question data 27d. If necessary, scoring is performed. Specifically, points allocated to each question are added up based on the results of the correct/incorrect determination. In addition, the character data extracting unit 32 also extracts blanks in the answer sections 55a to 55c. In other words, it is determined whether the answer sections 55a to 55c have been filled out. In this example, since all the answer sections 55a to 55c have been filled out, it is determined that there are no blanks in the answer sections 55a to 55c.

The results of correct/incorrect determination are stored in the hard disk 17 (S27). Specifically, the results are stored in the learning history data 27c. The stored correct/incorrect determination results of the question sections 54a to 54c will be taken into consideration to extract questions the next time.

In addition, image data is created with the correct/incorrect determination results. Specifically, the correct/incorrect determination results are added in the form of a correct mark and incorrect mark to the read image data, and the image is formed. The formed image is subsequently printed out (S28).

At this point, it is determined whether learning time is still left, in other words, whether time remains from the input learning time (S29). The remaining time is determined based on the difference between the learning time input in the learning time input field 43b on the display screen 21 shown in FIG. 6 and the time when the correct/incorrect determination is completed. If it is determined that learning time still remains (YES in S29), an inquiry for another question is issued (S30).

If the multifunction peripheral 11 receives a request to prepare another question (YES in S30), a question is extracted again based on the correct/incorrect determination results and the size of blank area, and an image of the question is formed (S31). The request for another question is also made through the operation unit 13.

Questions are extracted from the question data 27d again in accordance with the ratio of the correct answers. The following is a description about exemplary extraction of the question from the question data 27d in accordance with the correct answer ratio. When the correct answer ratio is 100%, questions that are more difficult than the questions answered in the created question sheet are extracted from the question data 27d and increased by 50%. When the correct answer ratio is 70%, questions that are more difficult than the questions answered in the created question sheet are extracted from the question data 27d and increased by 10%. When the correct answer ratio is 50%, the question data extracting unit 34 extracts questions that are the same level as the questions answered in the created question sheet, from the question data 27d. Alternatively, the questions incorrectly answered can be replaced with similar questions at the equivalent level extracted from the question data 27d.

If the control unit 12 determines that the newly extracted question can be printed in a blank area 57 on the question sheet 51 (YES in S32), a prompt for reload of the question sheet 51 appears (S33).

Figure 11:
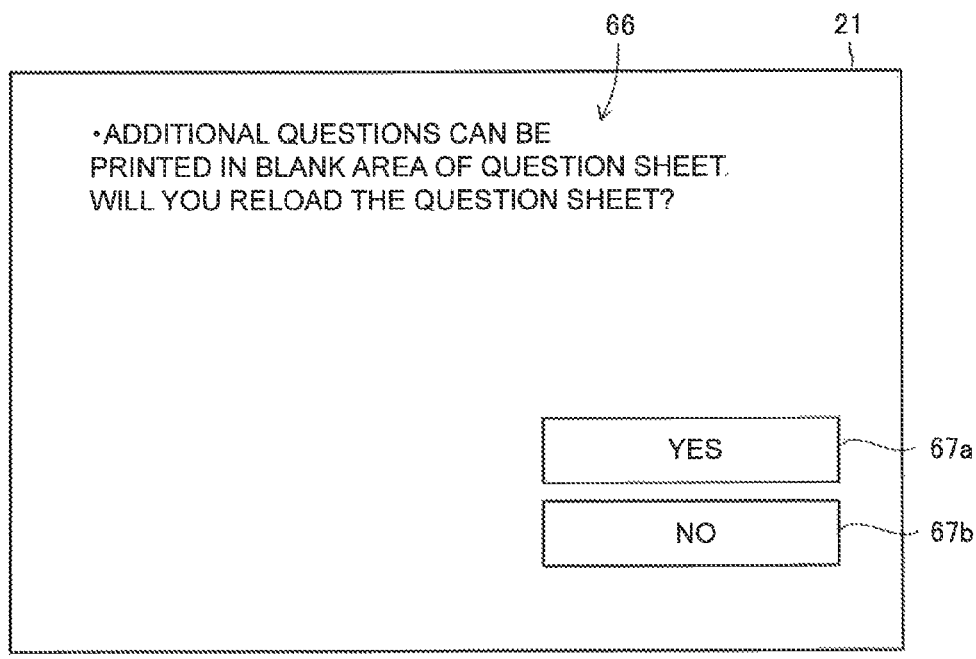
FIG. 11 shows an example display screen prompting for reload of the question sheet.

FIG. 11 shows an example display screen 21 prompting the teacher to reload the question sheet 51. Referring to FIG. 11, the display screen 21 includes an inquiry message 66 "Additional questions can be printed in the blank area of the question sheet. Will you reload the question sheet?", a selection key 67a that is labeled "YES" and used to select the loaded question sheet 51 for printing when pressed, and a selection key 67b that is labeled "NO" and used to select a sheet of paper accommodated in a paper feed cassette 16, which is a new sheet of paper, for printing when pressed. The teacher loads the question sheet 51 with the answers already filled in, for example, into the manual feed tray 23 and presses the selection key 67a. When the question sheet 51 is loaded again (YES in S34), the newly extracted question is printed on the loaded question sheet 51 (S35).

Figure 12:
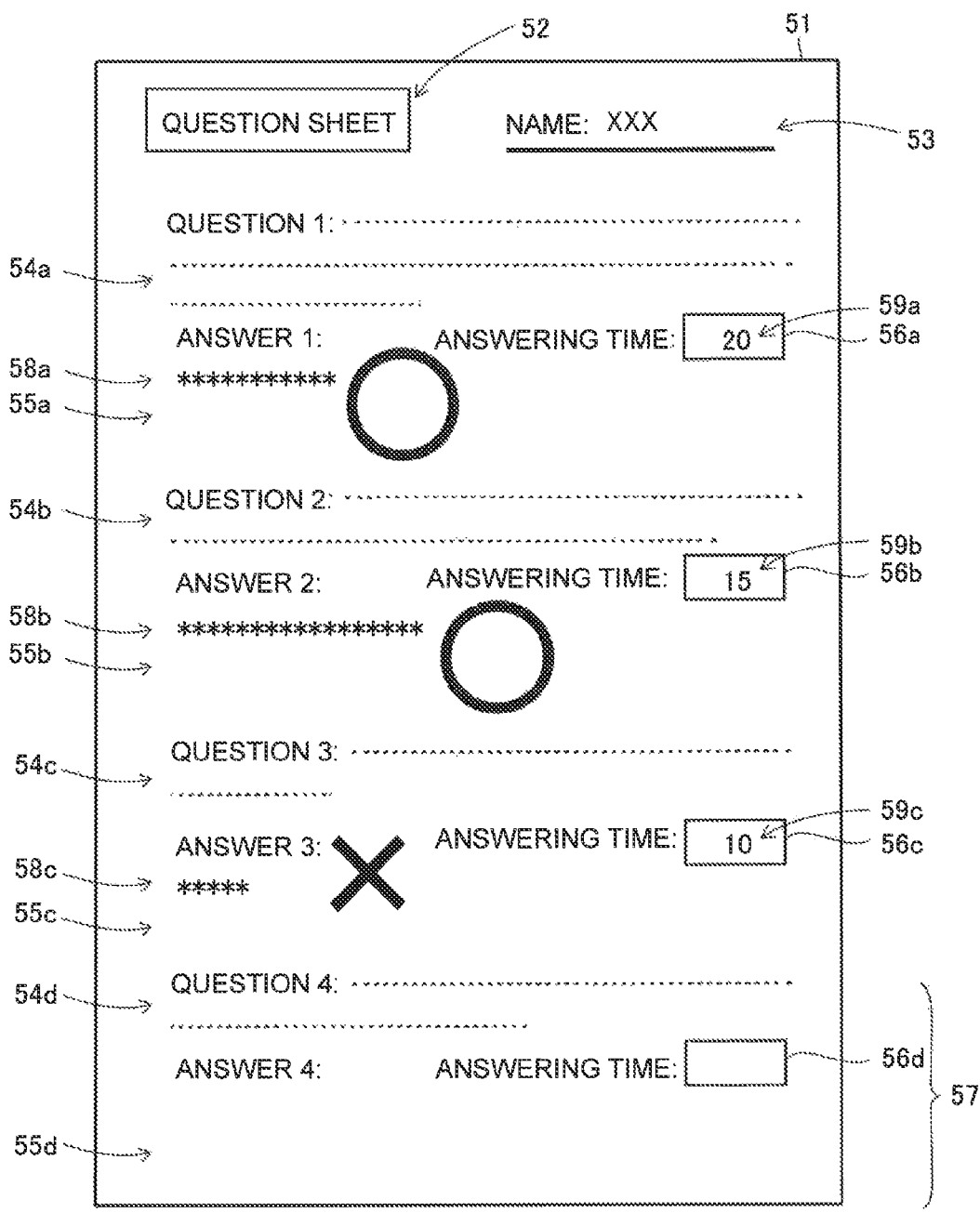
FIG. 12 shows the question sheet printed with another question extracted.

FIG. 12 shows the question sheet 51 with the newly extracted question printed thereon. Referring to FIG. 12, a question section 54d is newly created and printed in the blank area 57. An answer section 55b is provided under the question section 54b, and an answering time field 56b is provided at the upper right with respect to the answer section 55b. The answers 58a to 58c, which have been already written, remain the same. In addition, the answers 58a to 58c are marked.

On the other hand, if, in S34, the teacher presses the selection key 67b without loading the question sheet 51 (NO in S34), the newly extracted question is formed into an image and printed on a new sheet of paper accommodated in the paper feed cassette 16 (S36).

If it is determined that there is no learning time left in S29 (NO in S29), the results are stored in the hard disk 17 and the process is terminated. Specifically, data relating to the correct/incorrect determination and some other information are stored in the learning history data 27c, and the data is utilized to extract questions when the learner studies the next time. If the multifunction peripheral 11 does not receive a request for another question (No in S30), the process is also terminated.

The multifunction peripheral 11 configured as described above can read the question sheet with answers filled in, extracts characters by OCR, and determine if the answers are correct or incorrect. In accordance with the results of correct/incorrect determination, questions are extracted anew from the question data 27d in the hard disk 17 to create a question sheet 51. Since the correct/incorrect determination and other operations are performed after the answerer has been identified, question sheets tailored to the individuals can be created. In addition, the results of correct/incorrect determination are accumulated in the form of data, and are used to manage answerers. Thus, efficient creation of question sheets and various types of learner management can be achieved.

In this example, the question data extracting unit 34 is configured to extract more questions of a higher difficulty level when the ratio of correct answers determined by the correct/incorrect determining unit 33 is higher, thereby creating question sheets more suitable to the learning level of learners.

Also in this example, the question data extracting unit 34 is configured to extract questions from the question data based on the time left for writing the answers on the question sheet 51, and therefore the learning time can be efficiently used.

Also in this example, the question sheet image data forming unit 35 is configured to create image data of a question sheet 51 with a question arranged in the blank area 57, and therefore the sheet can be used with a minimum of wasted space.

In the above-described embodiment, the question data extracting unit 34 can be configured to extract questions of the same difficulty level from the question data in accordance with the size of the blank area on the question sheet 51. This can save the paper and achieve a more efficient use of blank areas.

Although in the above-described embodiment, the display screen 21 displays improperly written answers to prompt the teacher to correct them; however the present disclosure is not limited thereto, and the improperly written answers can be subjected to correction or other operations using a display device (not shown) connected via the network interface unit 18.

Although the personal ID is entered through the display screen 21 in the above-described embodiment, the present disclosure is not limited thereto, and the multifunction peripheral 11 can be configured to include an ID card information reading unit that reads information on personal ID cards. This configuration can save time and manpower to input personal ID.

In addition, reading the question sheet with answers filled in is operated by a teacher or instructor in the above-described embodiment; however, the present disclosure is not limited thereto, and a student of regular schools or cram schools, that is a learner, can perform the correct/incorrect determination step.

In the above-described embodiments, the answering time filled in on the question sheet can be used to affect questions to be extracted. Specifically speaking, for example, if a learner answers a question correctly in a short answering time, the question is regarded as a very easy question for the learner. When creating the question sheet again, a question similar to the question of the other field requiring a long time to answer may be extracted.

It should be understood that the embodiment disclosed herein is illustrative and non-restrictive in every respect. The scope of the present disclosure is defined by the terms of the claims, rather than by the foregoing description, and is intended to include any modifications within the scope and meaning equivalent to the terms of the claims.

The image forming apparatus according to the present disclosure can be effectively used especially to meet a demand for the efficient creation of question sheets and various types of management of learners.

What is claimed is:

1. An image forming apparatus capable of forming an image of a question sheet comprising:
    an image forming unit that forms images based on image data;
    an answerer identifying unit that identifies an answerer who fills in answers on a question sheet;
    an image reading unit that reads image data of the question sheet with answers filled in by the answerer;
    a character data extracting unit that extracts characters by means of optical character recognition (OCR) from the image data of the question sheet read by the image reading unit;
    a storage unit that stores question data including a plurality of questions of different difficulty levels;
    a correct/incorrect determining unit that determines the answers filled in on the question sheet as correct or incorrect based on the characters extracted by the character data extracting unit;
    a question data extracting unit that extracts a plurality of questions from the question data stored in the storage unit in accordance with the ratio of correct answers determined by the correct/incorrect determining unit, for each of the answerers identified by the answerer identifying unit;
    a question sheet image data creating unit that creates image data of the question sheet with the questions, which are extracted from the question data by the question data extracting unit, arranged on the question sheet; and
    an image formation control unit that performs control operations to form an image using the image forming unit based on the image data of the question sheet created by the question sheet image data creating unit.

2. The image forming apparatus according to claim 1, wherein
    the question data extracting unit extracts more questions of a higher difficulty level from the question data when the ratio of correct answers determined by the correct/incorrect determining unit is higher.

3. The image forming apparatus according to claim 1, wherein
    the question data extracting unit extracts questions from the question data based on time left for filling in answers on the question sheet.

4. The image forming apparatus according to claim 1, wherein
    the question sheet image data creating unit creates image data of the question sheet with the questions arranged in a blank area of the question sheet.

5. The image forming apparatus according to claim 1, wherein
    the question data extracting unit extracts questions of the same difficulty level from the question data in accordance with the size of the blank area on the question sheet.

6. The image forming apparatus according to claim 1, further comprising
    an ID card information reading unit that reads information on an ID card, wherein
    the answerer identifying unit identifies the answerer based on the information on the ID card read by the ID card information reading unit.

* * * * *